United States Patent
Ziesler (10) Patent No.: US 8,571,216 B2
(45) Date of Patent: Oct. 29, 2013

(54) ELIMINATING PLAINTEXT VIDEO FROM EXTERNAL MEMORY

(75) Inventor: Conrad H. Ziesler, Seattle, WA (US)

(73) Assignee: Apple Inc., Cupertino, CA (US)

( * ) Notice: Subject to any disclaimer, the term of this patent is extended or adjusted under 35 U.S.C. 154(b) by 1161 days.

(21) Appl. No.: 12/325,613

(22) Filed: Dec. 1, 2008

(65) Prior Publication Data

US 2010/0135489 A1    Jun. 3, 2010

(51) Int. Cl.
*G06F 21/00* (2013.01)
(52) U.S. Cl.
USPC .......................................................... 380/217
(58) Field of Classification Search
USPC ................................................. 380/210, 217
See application file for complete search history.

(56) References Cited

U.S. PATENT DOCUMENTS

| 6,226,384 | B1 | 5/2001 | Cavallerano et al. |
| 6,240,183 | B1 | 5/2001 | Marchant |
| 6,711,683 | B1 | 3/2004 | Laczko, Sr. et al. |
| 7,337,329 | B2 | 2/2008 | Evans |
| 7,356,671 | B1 | 4/2008 | Wei |
| 8,094,814 | B2 * | 1/2012 | Chen .............................. 380/29 |
| 2008/0120676 | A1 * | 5/2008 | Morad et al. ................... 725/127 |
| 2008/0168568 | A1 | 7/2008 | Brodersen et al. |

* cited by examiner

*Primary Examiner* — Jeffrey D Popham
(74) *Attorney, Agent, or Firm* — Lawrence J. Merkel; Meyertons, Hood, Kivlin, Kowert & Goetzel P.C.

(57) ABSTRACT

In an embodiment, an integrated circuit comprises a decompressor, an encrypt unit, and an on-chip image buffer coupled to the decompressor and the encrypt unit. The decompressor is configured to receive a compressed video stream, and to reconstruct a first frame of the video stream in the on-chip buffer. The encrypt unit is configured to generate one or more pixel block streams from pixel blocks of the first frame in the on-chip buffer according to sequence data describing an order of access of the pixel blocks to reconstruct subsequent frames of the video stream. The sequence data was previously generated via processing of the video stream by the integrated circuit, and the encrypt unit is configured to encrypt the pixel block streams to be written to an external memory. In an embodiment, an integrated circuit comprises a decrypt unit configured to decrypt an encrypted, compressed video stream; an on-chip buffer; and a decompressor coupled to the decrypt unit and the on-chip buffer. The decompressor is configured decompress the video stream, and to store a first portion of each of a first plurality of frames decompressed from the video stream in the on-chip buffer. The decompressor is further configured to store a remaining portion of each of the first plurality of frames in an external memory, wherein each frame as stored in the external memory is incomplete because the first portion is not stored in the external memory.

16 Claims, 8 Drawing Sheets

```
┌─────────────────────────────────────────────────────────────┐
│                     Sequence Data 36                        │
│                                                             │
│ F0 to F1:  P40; P14; P100: P37; ...                         │
│                                                             │
│ F0 to F2:  P47; P14; P112: P60; ...                         │
│                                                             │
│                    .                                        │
│                    .                                        │
│                                                             │
│ F4 to F7:  P98; P111; P17: P66; ...                         │
│                                                             │
│                    .                                        │
│                    .                                        │
└─────────────────────────────────────────────────────────────┘

┌─────────────────────────────────────────────────────────────┐
│                    Frame Temp Storage 34                    │
│                                                             │
│ F0 to F1:  PB40; PB14; PB100: PB37; ...                     │
│                                                             │
│ F0 to F2:  PB47; PB14; PB112: PB60; ...                     │
│                                                             │
│                    .                                        │
│                    .                                        │
│                                                             │
│ F4 to F7:  PB98; PB111; PB17: PB66; ...                     │
│                                                             │
│                    .                                        │
│                    .                                        │
└─────────────────────────────────────────────────────────────┘
```

ELIMINATING PLAINTEXT VIDEO FROM EXTERNAL MEMORY

BACKGROUND

1. Field of the Invention

This invention is related to the field of video content protection.

2. Description of the Related Art

Computing devices, from desktop computers to mobile personal digital assistants and cell phone devices, have been provided with high quality video display devices and corresponding processing power that has made such devices a desirable platform on which to view video content. However, given the ease with which digital data can be duplicated by virtually any user, the problem of content protection (e.g. protection of the content creator's copyright and/or trademark rights) has presented itself. While there are a variety of digital rights management schemes, typically the schemes involve encrypting the video stream so that only an authorized user (having the key or keys needed to decrypt the video stream) can view the video. In order to save space, the video stream is typically compressed prior to being encrypted, using any of a variety of compression schemes such as those specified by the Moving Pictures Expert Group (MPEG). While a user can make a copy of the encrypted video and give it to another user, the other user generally will not have the correct keys and cannot view the video. The other user is then forced to obtain his or her own licensed copy of the video.

Once the video stream has been decrypted on a computing device, it is important to protect the decrypted video stream from capture by an unauthorized person (e.g. via intrusive monitoring such as connecting a logic analyzer to a bus or other electronic transmission medium in the device). Typically, manufacturers of decryption/decompression hardware and/or software are required, as a condition of licensing the ability to play protected video content, to ensure that the decrypted video (or "plaintext" video) is not accessible to any third party. Transmitting the plaintext video over an external connection from a chip to, e.g., a memory would violate the condition. However, because the decompressed video can be very large for high resolution video (and because decompression often requires reference to data in previous frames of the video stream as specified in motion compensation vectors embedded in the compressed video stream), it is a practical impossibility in current chips to retain all of the plaintext video information within a chip. For example, retaining enough frames of a 1080p resolution video to perform decompression (e.g. about 6 frames) may require on the order of 36 Megabytes, which is generally not possible to implement on chip with logic to perform the decompression/decryption. Currently, content creators permit an exception to the condition above, permitting some video data to appear in plaintext in memory. It is expected that content creators will eventually demand that the exception be repealed.

SUMMARY

In one embodiment, a method comprises receiving an encrypted, compressed video stream in an integrated circuit. For each frame in the video stream, the method further comprises identifying pixel blocks in one or more previous frames that are used to reconstruct the frame. The method further includes generating sequence data for each previous frame, the sequence data identifying an order of access of pixel blocks in the respective previous frame to reconstruct each frame. The method further comprises reconstructing a first frame; and generating one or more pixel block streams from the pixel blocks in the first frame according to the sequence data. The method still further comprises encrypting the pixel block streams; and writing the encrypted pixel block streams to an external memory.

In an embodiment, an integrated circuit comprises a decompressor, an encrypt unit, and an on-chip image buffer coupled to the decompressor and the encrypt unit. The decompressor is configured to receive a compressed video stream, and to reconstruct a first frame of the video stream in the on-chip buffer. The encrypt unit is configured to generate one or more pixel block streams from pixel blocks of the first frame in the on-chip buffer according to sequence data describing an order of access to the pixel blocks to reconstruct subsequent frames of the video stream. The sequence data was previously generated via processing of the video stream by the integrated circuit, and the encrypt unit is configured to encrypt the pixel block streams to be written to an external memory, wherein the external memory is external to the integrated circuit.

In one embodiment, a method comprises receiving an encrypted, compressed video stream in an integrated circuit. The method further comprises decrypting and decompressing a first plurality of frames from the video stream. The method still further comprises storing a first portion of each of the first plurality of frames in an on-chip buffer on the integrated circuit. The method further includes storing a remaining portion of each of the first plurality of frames in an external memory, wherein each frame as stored in the external memory is incomplete because the first portion is not stored in the external memory.

In an embodiment, an integrated circuit comprises a decrypt unit configured to decrypt an encrypted, compressed video stream; an on-chip buffer; and a decompressor coupled to the decrypt unit and the on-chip buffer. The decompressor is configured decompress the video stream, and to store a first portion of each of a first plurality of frames decompressed from the video stream in the on-chip buffer. The decompressor is further configured to store a remaining portion of each of the first plurality of frames in an external memory, wherein each frame as stored in the external memory is incomplete because the first portion is not stored in the external memory.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of an integrated circuit are described which protect plaintext video from capture by an unauthorized party and which may be implemented with limited on-chip buffer memory. For example, in one embodiment, the on-chip buffer may be approximately large enough to store one frame of video at the largest resolution that the integrated circuit is designed to handle.

In one embodiment, the integrated circuit may be configured to store a portion of each plaintext frame in the on-chip buffer, and the remaining portion may be stored in plaintext in memory. That is, the portion that is stored on-chip is not stored in the memory in plaintext. The integrated circuit may write predetermined data to the area in the external memory that corresponds to the on-chip portion (e.g. black pixels), or may simply allow whatever data is stored there to be remain. The on-chip portion may be selected to render the off-chip plaintext frames visually undesirable. For example, the on-chip portion may be selected from the center of each frame, since the most visually interesting part of the video is often in the center. Alternatively, other embodiments may use image processing techniques to identify the most visually interesting part of each image (e.g. measuring the amount of motion in areas of the image, or the amount of color variation).

By retaining a portion of each plaintext frame only in the on-chip buffer, the integrated circuit may thwart an unauthorized party's attempt to capture the video. The data available for capture is insufficient to provide a satisfying visual experience. Nevertheless, the plaintext frame data needed to reconstruct a subsequent frame may be available in either external memory or the on-chip buffer.

The size of the portion retained in the on-chip buffer may depend on the number of frames which are needed/desired for reconstructing subsequent frames. Generally, if up to N previous frames are desired, then 1/N of each frame may be stored in the on-chip buffer if the on-chip buffer is approximately the size of one frame. For example, if N is 6, then ⅙th of each frame is stored in the on-chip buffer. As images are reconstructed, the data for the oldest frame may be discarded.

This mechanism may scale with technology improvements that allow more memory to be included in an on-chip buffer. As the buffer increases, the amount of each frame that can be stored in the on-chip buffer increases as well. For example, if the buffer increases to the size of two frames, the 2/N of each frame may be stored in the buffer. If the buffer increases to the size of N frames, the entirety of each frame may be stored in the buffer.

In another embodiment, the integrated circuit may be configured to reorder the data included in a frame based on the order that the data will be accessed to reconstruct subsequent frames. The reordered data may then be encrypted using a strong encryption algorithm, and may be written to external memory. More particularly, there may be a pixel block stream for each subsequent frame that accesses pixel blocks in the current frame, and the stream of pixel blocks may be provided in the order that they are used. Strong encryption algorithms may include sequential encryption algorithms, in which the data being encrypted is treated as a sequential stream of data. The result of encrypting a later block of data in the stream is dependent on the preceding data blocks in the data stream (or one or more of the preceding data blocks). For example, some sequential encryption algorithms use a recursive generator function in which the encryption of a current block depends on previous block(s) and/or the resulting encrypted block(s).

With strong encryption, the reordered frame data may be stored in memory with a level of protection that is similar to the protection of the original encrypted, compressed video stream. Since the data has been reordered to match the order that the data will be accessed for each subsequent frame, a sequential encryption algorithm can be used. The data can be sequentially decrypted, and the data that is needed next will be available. On the other hand, if the frame were sequentially encrypted without reordering, significant amounts of decrypting might be required to reach the next data that is needed (requiring more on-chip buffering or repeated decrypting of the same data), because the accesses to previous frames are essentially random accesses within the frame (controlled by the motion compensation vectors and/or other data in the compressed video stream).

To determine the order that data will be accessed, the integrated circuit may perform two passes through the source video stream. The first pass may use the motion compensation vectors and/or other control data from the source video stream to determine the order that data will be accessed, generating sequence data that describes the order. For example, the sequence data may list identifiers of the pixel blocks that will be accessed in the order of the accesses. The integrated circuit may write the sequence data to memory. Since the sequence data is not part of the protected content, the sequence data may be written in plaintext. In general, the sequence data may be any data that describes the sequence of accesses to frame data that will occur when subsequent frames are reconstructed.

In the second pass, frames may be reconstructed and displayed. Additionally, the sequence data may be used to reorder the frame data for encryption. The encrypted, reordered data may be written to external memory, and is thus protected from attack. When a subsequent frame is to be reconstructed, then the encrypted, reordered data may be decrypted and used to reconstruct the subsequent frame.

Figure 10:
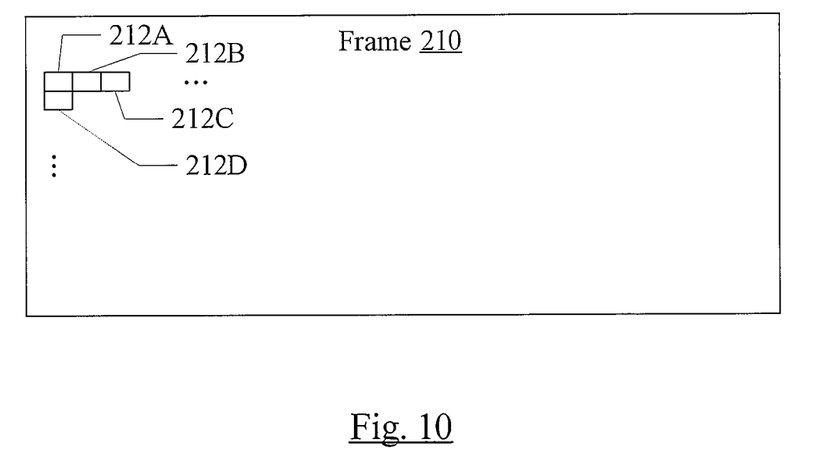
FIG. 10 is a block diagram of one embodiment of a frame illustrating pixel blocks.

As used herein, a frame may be one image from a video stream. The frames are displayed in the order provided in the video stream, at a frame rate specified by the video stream (e.g. 30 frames per second, 15 frames per second, etc.) to play the video on the display device. FIG. 10 is a block diagram illustrating an exemplary frame 210. The frame 210 may comprise a plurality of pixel blocks including pixel blocks 212A-212D shown in FIG. 10. Each pixel block comprises a plurality of pixels in a defined shape (e.g. a square or rectangle). Pixel blocks may be fixed in size, at least for a given video stream, although the size of pixel blocks may vary from embodiment to embodiment and/or stream to stream. The pixel block may be the unit of data that can be referenced in a frame. That is, when a frame references a previous frame for data in a compressed video stream, the frame references a particular pixel block in that previous frame. There may also be a residual in the frame, which modifies the referenced pixel block to produce the desired pixel block in the current frame. The source pixel block in the previous frame may not be in the same location within the previous frame as the desired pixel block in the current frame. Instead, the motion compensation vector may locate the desired pixel block.

It is noted that the pixel block streams that are encrypted and written to memory may not include all of the pixel blocks from the frame. Some pixel blocks may not be accessed by any subsequent frame, and thus need not be stored.

System Overview

Figure 1:
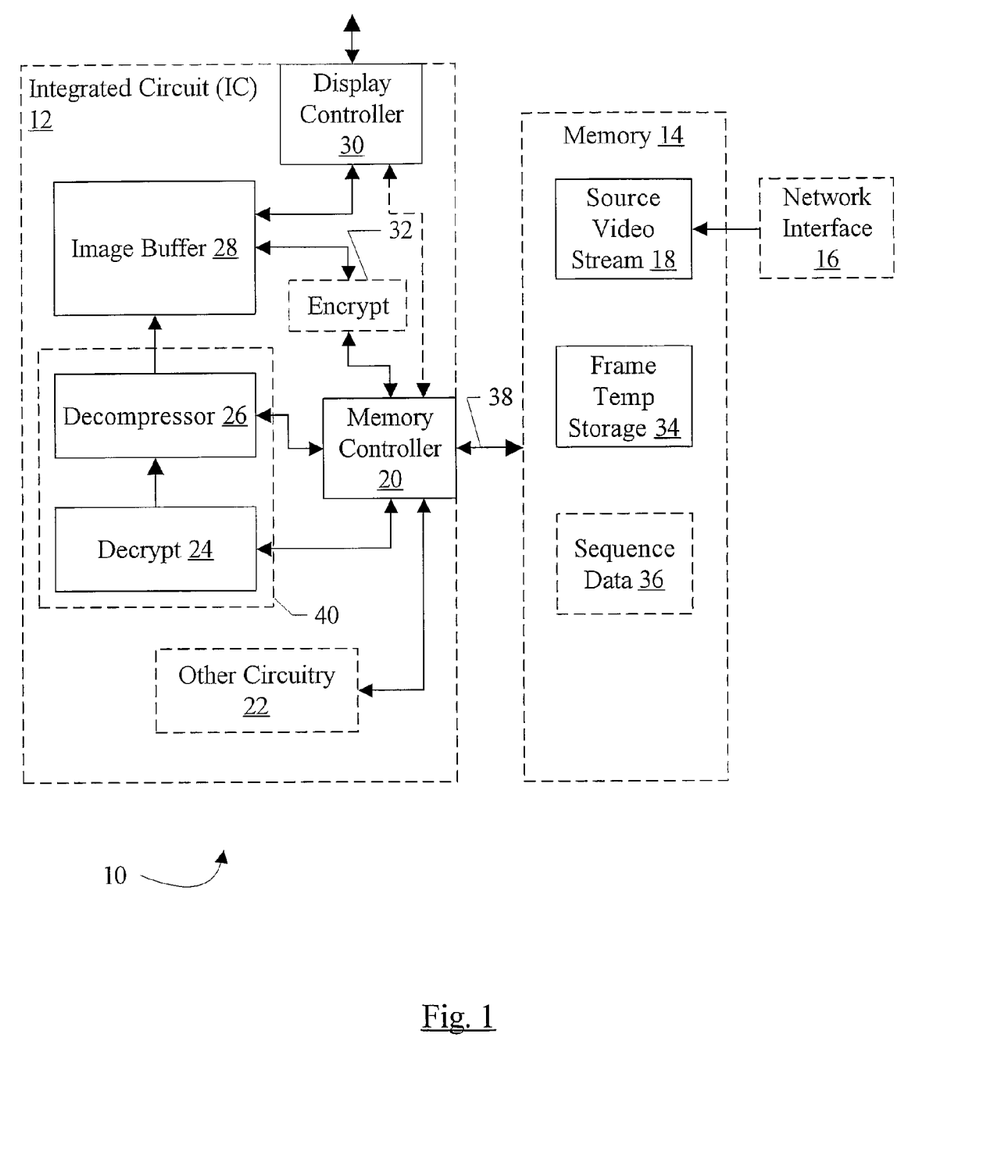
FIG. 1 is a block diagram illustrating one embodiment of a system.

Turning now to FIG. 1, a block diagram of a system 10 is shown that includes an integrated circuit (IC) 12 coupled to an external (to the IC) memory 14. The system 10 may also include a source for a source video stream 18 (e.g. a network interface 16, which may transfer the source video stream 18 to the system 10 from a network such as a local area network, the Internet, etc.). In the illustrated embodiment, the IC 12 includes a memory controller 20, other circuitry 22, a decrypt unit 24, a decompressor 26, an image buffer 28, an encrypt unit 32, and a display controller 30. The other circuitry 22 may be optional, and may not be included in other embodiments. Additionally, different levels of integration may be implemented in various embodiments of the IC 12. For example, in some embodiments, the memory controller 20 and/or the display controller 30 may be external to the IC 12. Generally, the IC 12 may comprise a single semiconductor substrate on which the circuitry included in the IC 12 is formed. In the illustrated embodiment, the memory controller 20 is coupled to the other circuitry 22, the decrypt unit 24, the decompressor 26, and the encrypt unit 32. The decrypt unit 24 is coupled to the decompressor 26, which is coupled to the image buffer 28. The image buffer 28 is coupled to the encrypt unit 32 and the display controller 30. In some embodiments, the display controller 30 is also coupled to the memory controller 20. In the illustrated embodiment, the memory 14 stores the source video stream 18, a frame temporary storage area 34, and in some embodiments a sequence data area 36 during use.

For playing an encrypted, compressed video stream such as the source video stream 18, the decrypt unit 24 may issue memory read requests to the memory controller 20 to read the source video stream 18. The decrypt unit 24 may include circuitry to receive the stream of bytes and to decrypt the bytes. The decrypt unit 24 may store one or more keys used for the decryption, in secure storage not accessible to the typical user. Any encryption scheme or schemes may be implemented, in various embodiments. For example, the stored key may be a private key and the system 10 may transmit a public key to the content creator for encrypting the source video stream. Alternatively, the key may be provided in a secure transmission from the content creator that owns the source video stream 18. The encrypted source video stream 18 may identify the encryption scheme used, or the decrypt unit 24 may be programmable to select among encryption schemes, if the decrypt unit 24 implements more than one scheme.

The decrypt unit 24 may pass the decrypted data stream to the decompressor 26. In sequential encryption schemes, the decrypted data stream may be provided as a stream of data blocks, and the decompressor 26 may begin processing provided data blocks while the decrypt unit 24 continues to decrypt subsequent blocks in the stream. The decompressor 26 may comprise circuitry configured to decompress frames from the decrypted data stream, according to the compression scheme implemented by the content creator. The decompressor 26 may support one or more compression schemes. The beginning of the source video stream 18 may include control data that specifies the compression scheme, and the decompressor 26 may decompress the stream using the specified compression scheme. Alternatively, the compression scheme may be specified separately, e.g. software may program the decompressor 26 to perform the decompression.

The decompressor 26 may also manage the image buffer 28, which may comprise any sort of on-chip memory (e.g. SRAM). The image buffer 28 is on-chip, and therefore data stored in the image buffer 28 in plaintext is considered secure. The decompressor 26 may manage the image buffer 28 in various fashions, as described in more detail below for various embodiments. The image buffer 28 may become full, and if data in the image buffer 28 is expected to be needed again (e.g. for decompressing subsequent frames), the decompressor 26 may generate write requests to the memory controller 20 to write the data to the frame temp storage 34 in memory. The decompressor 26 may also generate read requests to the memory controller 20 to read data from the frame temp storage 34 for decompressing frames, if the data is not stored in encrypted form. If the data is encrypted, the decrypt unit 24 may generate the read requests, or the decompressor 26 may generate the requests and the data may be provided to the decrypt unit 24. In embodiments in which the sequence data 36 is generated, the decompressor 26 may also generate read and write requests to the memory controller 20 to read and write the sequence data 36.

In embodiments which encrypt data to be written to the frame temp storage 34, the encrypt unit 32 may perform the encryption. The encrypt unit 32 may employ the same encryption algorithm(s) as the decrypt unit 24, in some embodiments, and may use the same encryption algorithm used on the source video stream. Alternatively, the encrypt unit 32 may use a different encryption scheme. The encrypt unit 32 may store its own keys for encrypting, or may share keys with the decrypt unit 24. Particularly, if the decrypt unit 24 is used to decrypt the encrypted data read from the frame temp storage 34, the encrypt unit 32 and the decrypt unit 24 may share keys. The encrypt unit 32 may provide the encrypted data to the memory controller 20 to write to the frame temp storage 34.

The display controller 30 may read the frame data to be displayed from the image buffer 28 (and the frame temp storage 34, in some embodiments), and may drive a display (not shown) in the system 10. The display controller 30 may be designed to drive any type of display (e.g. cathode ray tube, liquid crystal display, plasma display, thin film transistor (TFT) display, etc.).

The other circuitry 22 may comprise any other desired functionality for the IC 12. In one embodiment, there may be no other circuitry 22 and the IC 12 may be dedicated to secure video decryption/decoding and display. In other embodiments, the IC 12 may include additional functionality. For example, the other circuitry 22 may include one or more processors configured to execute instructions. In some embodiments, a portion of the decryption/decompression/encryption functionality may be implemented in software executed by the one or more processors, in conjunction with the decrypt unit 24/decompressor 26/encrypt unit 32 hardware. Any combination of hardware circuitry and software may be used in various embodiments. The other circuitry 22 may also include any other desired functionality.

The memory controller 20 may comprise circuitry configured to interface to the memory 14 and coupled to receive memory read and write requests from various components in the IC 12. The memory controller 20 may include queues for managing the requests and data to/from the memory 14, request ordering logic, etc. The interconnect between the memory controller 20 and the other components of the IC 12 may take any desired form (e.g. a bus to which the components connect and for which the components arbitrate, point to point communications between the components and the memory controller 20, etc.). The interconnection between the components of the IC 12 is intended to be a high level logical view, and any physical interconnection may be used in various embodiments.

The memory 14 may be formed of any desired semiconductor memory. For example, the memory 14 may comprise static random access memory (SRAM), dynamic random access memory (DRAM), synchronous DRAM (SDRAM) such as double data rate (DDR) SDRAM, DDR2 SDRAM, or DDR3 SDRAM, RAMBUS DRAM (RDRAM), video RAM (VRAM), etc. Alternatively or in addition, the memory 14 may comprise non-volatile memory such as flash memory. The memory 14 may comprise one or more memory modules, each of which includes multiple memory chips. Accordingly, in the illustrated embodiment, the channel 38 may comprise an interface to memory modules.

While the network interface 16 is shown as writing the source video stream 18 to the memory 14, the network interface 16 may write the data through various hardware (e.g. direct memory access (DMA) hardware). In some embodiments, the network interface 16 may be included in the IC 12 and may write the data through the memory controller 20 on the IC 12. In still other embodiments, the memory controller 20 may be external to the IC 12, and the network interface 16 may be external and coupled to the memory controller 20 (or through DMA hardware to the memory controller 20). In still other embodiments, the source video stream 18 may be provided in other fashions (e.g. via a mass storage device that is part of the system 10 or coupled thereto, etc.).

The decrypt unit 24 and the decompressor 26 are illustrated as separate components in FIG. 1 for convenience in the illustration and the discussion herein. In some embodiments, the decrypt unit 24 and the decompressor 26 may be separate components. Alternatively, in other embodiments, the decrypt unit 24 and the decompressor 26 may be integrated together (illustrated by the dotted box 40).

While not shown in FIG. 1, some embodiments of the system 10 may include caches for the memory 14 (either external or internal, or both). Data read from/written to the memory 14 may be completed in cache, in such embodiments.

Since the memory 14 is external to the IC 12, the communication channel 38 between the IC 12 and the memory 14 is not secure. Similarly, for embodiments in which the memory controller 20 is not included in the IC 12, the communication channel between the IC 12 and the memory controller 20 (e.g. a bus, packet interface, etc.) would not be secure. Various mechanisms for maintaining the security of the source video stream 18 during playback while providing data for reconstructing frames from up to N previous frames are described below.

Embodiments that Retain a Portion of Each Frame in the Image Buffer

Figure 2:
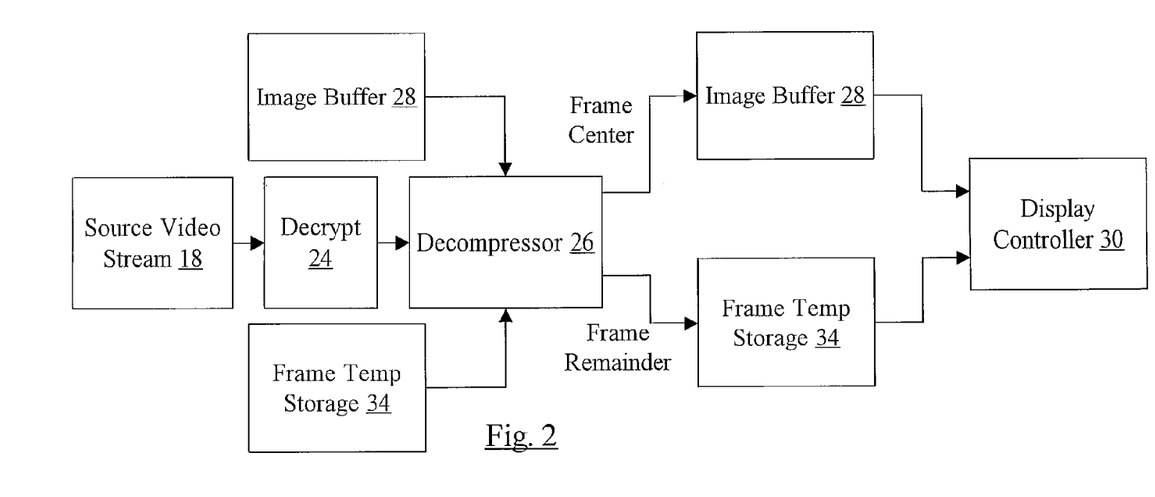
FIG. 2 is a block diagram illustrating one embodiment of data flow for a source video stream in one embodiment of the system.
Figure 3:
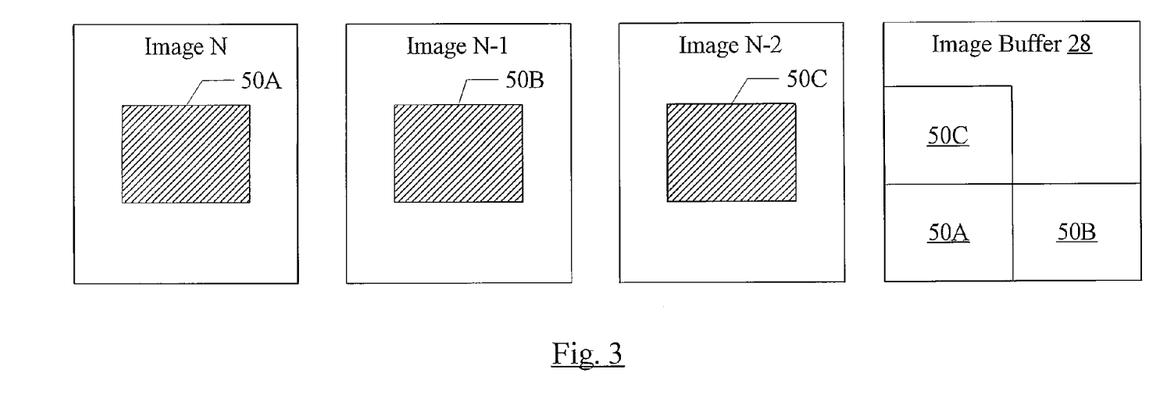
FIG. 3 is a block diagram illustrating frame data that may be stored in external memory, for one embodiment.

As mentioned previously, some embodiments may retain a portion of each frame in the image buffer 28, and write the remaining portion of each frame to the memory 14. The portion retained on chip may include the most visually-interesting portion of each frame (e.g. the center portion, or a portion identified via image processing techniques). Accordingly, while some of the frame data is available in plaintext in the memory 14, the frame data is essentially unusable because of the missing frame data. That is, the portion that is retained on-chip in the image buffer 28 is not written to the external memory 14. For example, several images N, N−1, and N−2 from a video sequence are illustrated in FIG. 3. The portion of the frames that is not shaded may be stored in the frame temp storage 34 in main memory, in plaintext. However, the shaded frame centers 50A, 50B, and 50C may be retained on-chip in the image buffer 28, and thus the frame centers 50A-50C are not available in the frame temp storage 34. As illustrated in FIG. 3, the frame buffer 28 may be logically divided in to N sections (wherein N is the number of previous frames that are retained by the decompressor 26 to decompress a current frame). The frame center of each previous frame is stored in a respective one of the N sections (e.g. frame centers 50A-50C are shown in FIG. 2 in the image buffer 28). The logical division of the image buffer 28 and the arrangement of data therein may be performed in any desired fashion. For example, frame data may be interleaved in the image buffer 28, or arranged in any other fashion for convenient access.

The data that would correspond to the frame centers 50A-50C in the temp frame storage 34 may be managed in any fashion. For example, there may be no data stored for the frame centers 50A-50C in the frame temp storage 34 (that is, the image data stored in the frame temp storage 34 may be collapsed together, leaving no space for the missing center data); the frame centers 50A-50C may not be written with data, and thus the data that is already in the frame temp storage 34 at the frame centers may remain stored there; the IC 12 may write specified data (e.g. black pixels) to the frame centers 50A-50C in the frame temp storage 34; or the IC 12 may write random data to the frame centers 50A-50C in the frame temp storage 34; in various embodiments.

FIG. 2 is a block diagram illustrating a flow of data through various components of the IC 12 and the memory 14 for one embodiment. The source video stream 18 may be read from memory 14, and the decrypt unit 24 may decrypt the video stream. The decrypt unit 24 passes the decrypted video stream to the decompressor 26. The decompressor 26 decompresses each frame of the decrypted video stream. In the case that a frame references a pixel block from a previous frame, the decompressor 26 may read the data from the image buffer 28 (for a pixel block in the frame center of the previous frame) or the frame temp storage 34 (for a pixel block in the frame remainder of the previous frame). It may be possible that a pixel block is partially stored in the image buffer 28 and partially in the frame temp storage 34, in some embodiments. In such a case, each portion may be read from its respective storage and the decompressor 26 may merge the data to form the pixel block.

The decompressor 26 may write the pixel blocks of a current frame to the image buffer 28 or the frame temp storage 34, depending on the location of the pixel block in the current frame (frame center or frame remainder) The display controller 30 may read a frame for display, reading the frame center from the image buffer 28 and the frame remainder from the frame temp storage 28 (through the memory controller 20).

Figure 4:
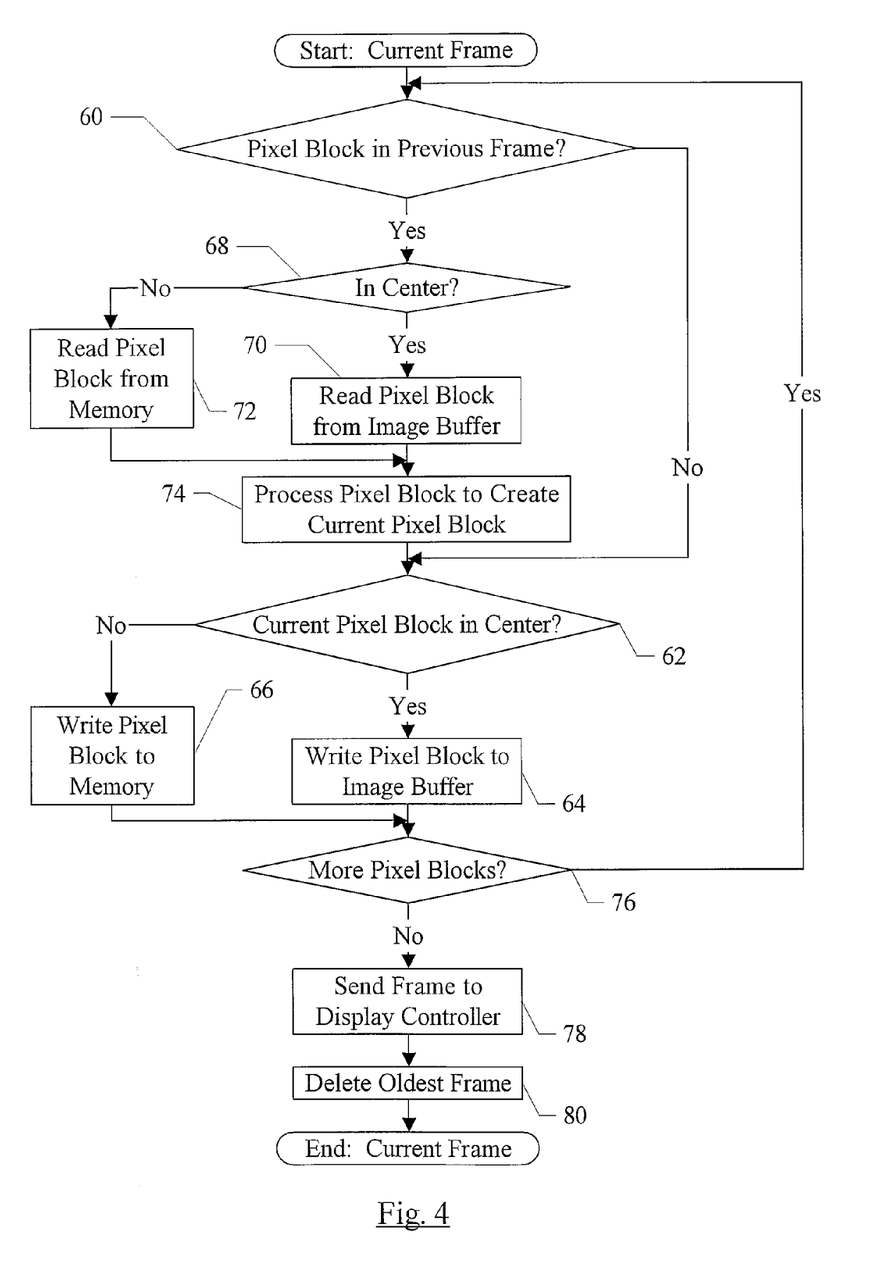
FIG. 4 is a flowchart illustrating operation of one embodiment of an integrated circuit to protect video content.

Turning next to FIG. 4, a flowchart is shown illustrating operation of one embodiment of the IC 12 (and more particularly the decompressor 26, in one embodiment) to process a current frame of the source video stream 18. While the blocks are shown in a particular order for ease of understanding, other orders may be used. Blocks may be performed in parallel in combinatorial logic circuitry in the decompressor 26.

Blocks, combinations of blocks, and/or the flowchart as a whole may be pipelined over multiple clock cycles, as desired.

For a given pixel block in the current frame, the decompressor 26 may examine the motion compensation vector and may determine if the pixel block is found in a previous frame (decision block 60). If the pixel block is not found in a previous frame (i.e. it is directly included in the current frame—decision block 60, "no" leg), the decompressor 26 may write the pixel block. Specifically, if the current pixel block is in the frame center (decision block 62, "yes" leg), the decompressor 26 may write the pixel block to the image buffer 28 (block 64). The decompressor 26 may have a portion of the image buffer 28 allocated to store the pixel blocks of the current frame, and may write the pixel block to the allocated portion. If the current pixel block in not in the frame center (decision block 62, "no" leg), the decompressor 26 may write the current pixel block to memory 14, and more particularly to the frame temp storage 34 (block 66). Again, the decompressor 26 may have allocated a portion of the frame temp storage 34 to store the current frame, and the decompressor 26 may write the pixel block to the storage. It is noted that, in some embodiments, the decompressor 26 and/or the memory controller 20 may accumulate pixel blocks to be written to memory, and perform one write operation to the memory 14 for multiple pixel blocks, to improve memory bandwidth usage.

On the other hand, if the pixel block is found in a previous frame (decision block 60, "yes" leg), and the pixel block in the previous frame is in the frame center (decision block 68, "yes" leg), the decompressor 26 may read the pixel block from the image buffer 28 (block 70). The decompressor 26 may determine the address of the pixel block in the image buffer 28 based on which previous image it is read from and the location of the frame center for that previous image in the image buffer 28. If the pixel block in the previous frame is not in the frame center (decision block 68, "no" leg), the decompressor 26 may read the pixel block from memory (block 72). It is noted that the location of the pixel block referred to in blocks 68, 70, and 72 is the location in the previous frame. The location in the previous frame may not be the same as the location of the current pixel block in the current frame, since the video stream typically includes motion of the objects in the video. The decompressor 26 may optionally process the pixel block (e.g. applying a residual to the pixel block) to generate the current pixel block for the current frame (block 74). Similar to the case that the current pixel block was provided in the current frame from the source video stream 18, the decompressor 26 may write the pixel block to the image buffer 28 or to the frame temp storage 34, depending on the location of the pixel block (blocks 62, 64, and 66).

If there are still more pixel blocks to process in the current frame (decision block 76, "yes" leg), the decompressor 26 may select the next pixel block in the current frame and repeat the above processing. It is noted that the processing of blocks 60, 62, 64, 66, 68, 70, 72, 74, and 76 may be performed in parallel by the decompressor 26 on two or more pixel blocks of the current frame.

If all pixel blocks for the current frame have been processed (decision block 76, "no" leg), the current frame is complete. In some embodiments, the decompressor 26 may communicate with the display controller 30 to inform the display controller 30 that the current frame is available for display (block 78). The decompressor 26 may also delete the oldest frame from the frame buffer 28/frame temp storage 34, and reallocate the space previously occupied by the oldest frame to the next frame (which becomes the current frame). The operation of FIG. 4 may be repeated for the new current frame.

It is noted that, while the present embodiment stores portions of the each frame in the image buffer 28 or the frame temp storage 34 based on pixel blocks, other embodiments may divide the frame data in other ways. For example, the portion of the frame stored on-chip may be a portion of each pixel (e.g. a certain number of bits of the data that represent each pixel). Each pixel may be represented by a set of bits which define the color of that pixel (e.g. 3 sets of bits may specify the amount of red, green, and blue in the pixel for an RGB display, other displays may use other colors or other descriptions of each pixel).

It is noted that, in some embodiments, the image buffer 28 may be used for other purposes when video streams are not being played. For example, in one embodiment, the IC 12 may implement one or more on-chip caches. The image buffer 28 may be implemented by locking a portion of one of the on-chip caches (preventing the portion's use as cache memory for other operation of the IC 12) and the locked portion may be used as the image buffer 28. Alternatively, the image buffer 28 may be converted into a cache when video streams are not being played.

Embodiments that Encrypt Data to be Written to the External Memory

As mentioned previously, other embodiments may encrypt pixel block streams that are to be retained for use in reconstructing subsequent frames of the compressed video stream. More particularly, the pixel blocks in the frames may be reordered from their original, spatial order in the frame to instead be the order in which the pixel blocks will be accessed for processing a given subsequent frame. Since the pixel blocks are ordered as they will be accessed, a strong, sequential encryption algorithm may be used to encrypt the data, making compromise of the data in the memory 14 less likely. There may be one pixel block stream for each subsequent frame that accesses pixel blocks in the current frame.

Figure 5:
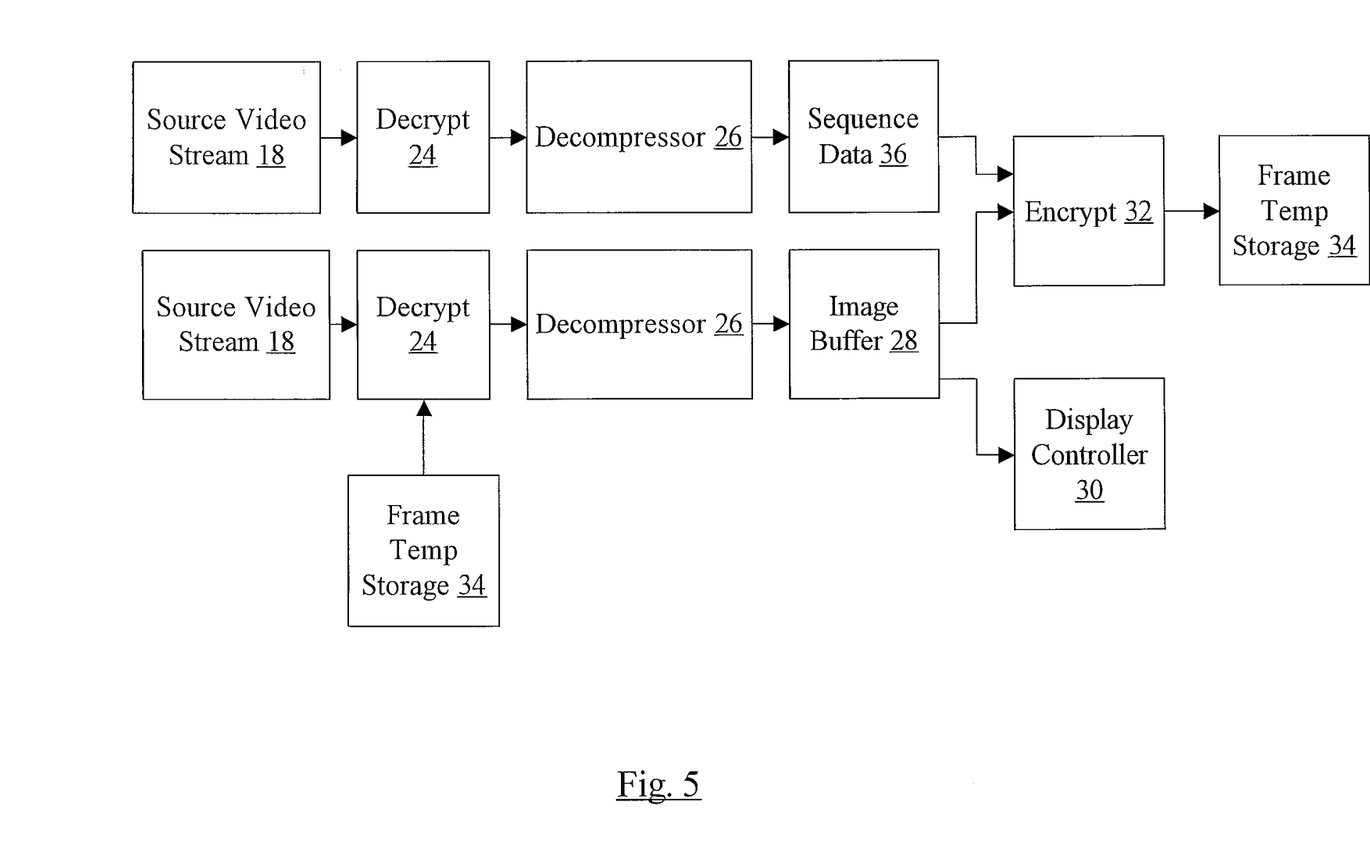
FIG. 5 is a block diagram illustrating one embodiment of data flow for a source video stream in one embodiment of the system.

FIG. 5 is a block diagram illustrating a flow of data through the IC 12 and the memory 14, for one embodiment. Two parallel paths are shown. The upper path in FIG. 5, which creates the sequence data 36, is the first pass. The first pass may be performed entirely before the second pass, or may lead the second pass by a sufficient margin that the sequence data 36 for a given frame is ready when that given frame is reconstructed in the second pass. For example, if up to N subsequent frames can reference pixel blocks in the current frame, the first pass may be at least N frames ahead of the second pass in processing the source video stream 18. Performing the first pass and the second pass in parallel (or interleaving the first pass and the second pass) may be particularly useful in the case of streaming video. With streaming video, later portions of a video stream continue to be received while earlier portions are displayed and discarded by the receiving device (e.g. the system 10 in this case). Accordingly, performing the first pass to completion prior to starting the second pass may not be feasible for streaming video. In FIG. 1, for example, the source video stream 18 may be only a portion of the complete video sequence, and additional video may be received by the network interface 16 as the currently-in-memory video is processed and displayed. The source video stream 18 may be a buffer in memory storing a portion of the video stream, which may be filled by the network interface 16 and drained by the IC 12.

In the first pass, the decrypt unit 24 may read the source video stream 18 from the memory 14, and may pass a decrypted stream to the decompressor 26. The decompressor 26 may process the decrypted stream. For each frame, the decompressor 26 may determine which previous frames in the video stream are accessed for pixel blocks, and in which order the accesses occur for a given previous frame. The order may depend on the video stream itself (e.g. the content of the motion compensation vectors dictate that certain pixel blocks be accessed) as well as the implementation of the decompressor 26 (e.g. the order in which the decompressor 26 would issue the reads of the pixel blocks from the preceding frames). The decompressor 26 may write the sequence data 36 for each preceding frame, identifying which pixel blocks are accessed and the order of the accesses. For example, the sequence data 36 may comprise a list of the pixel blocks (e.g. their x and y coordinates in the frame, or a number assigned to the pixel block that identifies its location in the frame). The list may be the order that the pixel blocks will be accessed for the given frame. Thus, there may be a sequence of pixel blocks for each previous frame and the given frame (or N pixel block sequences per frame).

In the second pass, the source video stream 18 is again read by the decrypt unit 24, which decrypts the stream and passes the decrypted stream to the decompressor 26. In some embodiments, additional on-chip buffering may be provided to buffer the decrypted stream from the first pass, so that the second pass can begin using the same decrypted source video stream. The additional buffering may need to be sufficient for most compressed streams of N frames, where N is the number of preceding frames that can be referenced by the current frame in the compressed stream.

The decompressor 26 may begin decompressing frames in the compressed stream. The decompressor 26 may also instruct the decrypt unit 24 to decrypt one or more pixel block streams from the frame temp storage 34, for pixel blocks that will be used in reconstructing the current frame. The decompressor 26 may reconstruct the frame from data in the decrypted video stream and from the decrypted pixel block streams, and may write the current frame to the image buffer 28. When the current frame is complete, the frame may be displayed by the display controller 30. Additionally, the encrypt unit 32 may reorder the pixel blocks in the current frame, according to the sequence data 36 that corresponds to the current frame (describing accesses to the current frame, and their order, for subsequent frames) to generate the pixel block streams for subsequent frames that depend on the current frame. The encrypt unit 32 may encrypt the pixel block streams, and write the encrypted data to the frame temp storage 34 (where they may subsequently be read by the decrypt unit 24 to reconstruct a subsequent frame).

It is noted that, in some embodiments, the decrypt unit 24 and the decompressor 26 may be provided with multiple processing paths, to permit generation of the sequence data 36 in parallel with reconstructing previous frames. The decrypt unit 24 may be doubled, and a portion of the decompressor 26 (enough to process the motion compensation vectors and/or other control information in the compressed video stream to generate the sequence data 36) may be doubled. Similarly, additional decrypt unit 24 hardware may be provided to decrypt the frame data from the frame temp storage 34 in addition to decrypting the source video stream. Alternatively, decrypt and/or decompressor hardware may be shared, and the input data may be multiplexed as needed into the shared hardware. Such embodiments may be implemented, e.g., to handle streaming video. The first pass through the streaming video may stay ahead of the second pass by enough frames to supply the sequence data for a given frame prior to its reconstruction (in a parallel hardware implementation), or the interleaving/multiplexing may be managed so that the first pass is multiplexed back into the decrypt unit 24/decompressor 26 to ensure that the sequence data for the given frame is generated before the second pass reaches a given frame.

Figure 6:
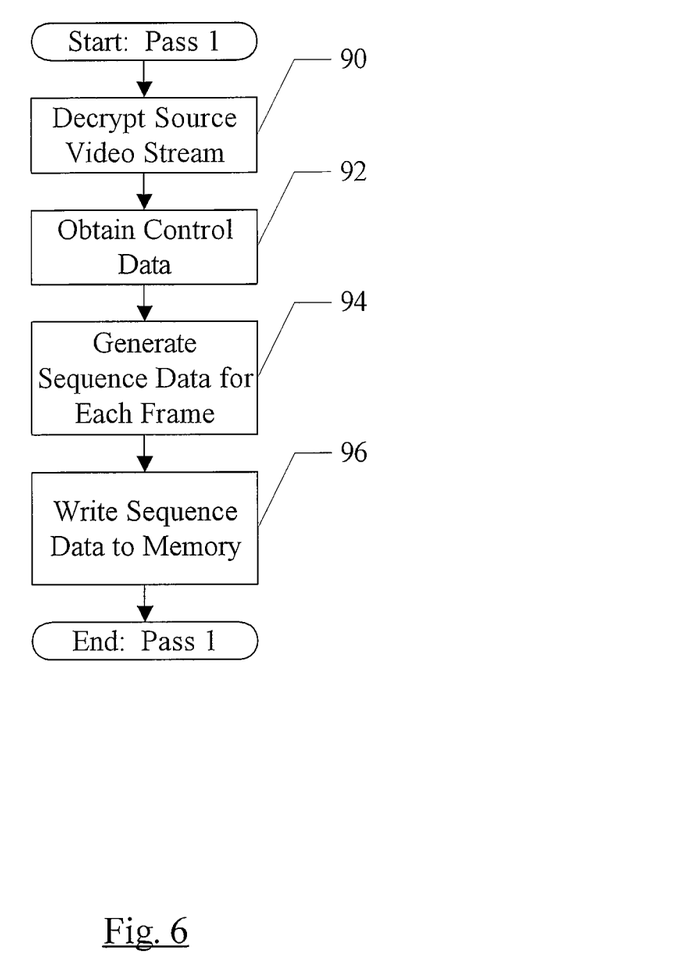
FIG. 6 is a flowchart illustrating operation of one embodiment of the integrated circuit to protect video content during a first pass through the video stream.

Turning next to FIG. 6, a flowchart is shown illustrating operation of one embodiment of the IC 12 (and more particularly the decrypt unit 24 and the decompressor 26, in one embodiment) during the first pass through a source video stream 18 to generate the sequence data 36. While the blocks are shown in a particular order for ease of understanding, other orders may be used. Blocks may be performed in parallel in combinatorial logic circuitry in the decrypt unit 24 and the decompressor 26. Blocks, combinations of blocks, and/or the flowchart as a whole may be pipelined over multiple clock cycles, as desired.

The decrypt unit 24 may decrypt the source video stream 18, and provide the decrypted, compressed video stream to the decompressor 26 (block 90). The decompressor 26 may obtain the control data from the decrypted, compressed video stream (block 92). That is, the decompressor 26 may process the compressed video stream to identify the accesses that would be used to reconstruct each frame, but may not actually reconstruct the frame. The control data may include motion compensation vectors and/or any other data that identifies a source for pixel data of a frame that is not directly included in that frame. From the control data, the decompressor 26 may generate sequence data 36 for each frame, identifying which pixel blocks will be accessed when subsequent frames are reconstructed (block 94). Thus, the sequence data 36 for each frame may be complete once the subsequent N frames in the compressed video stream have been processed (since up to N subsequent frames can refer to pixel data in the frame). The decompressor 26 may write the sequence data to memory (block 96).

Figure 7:
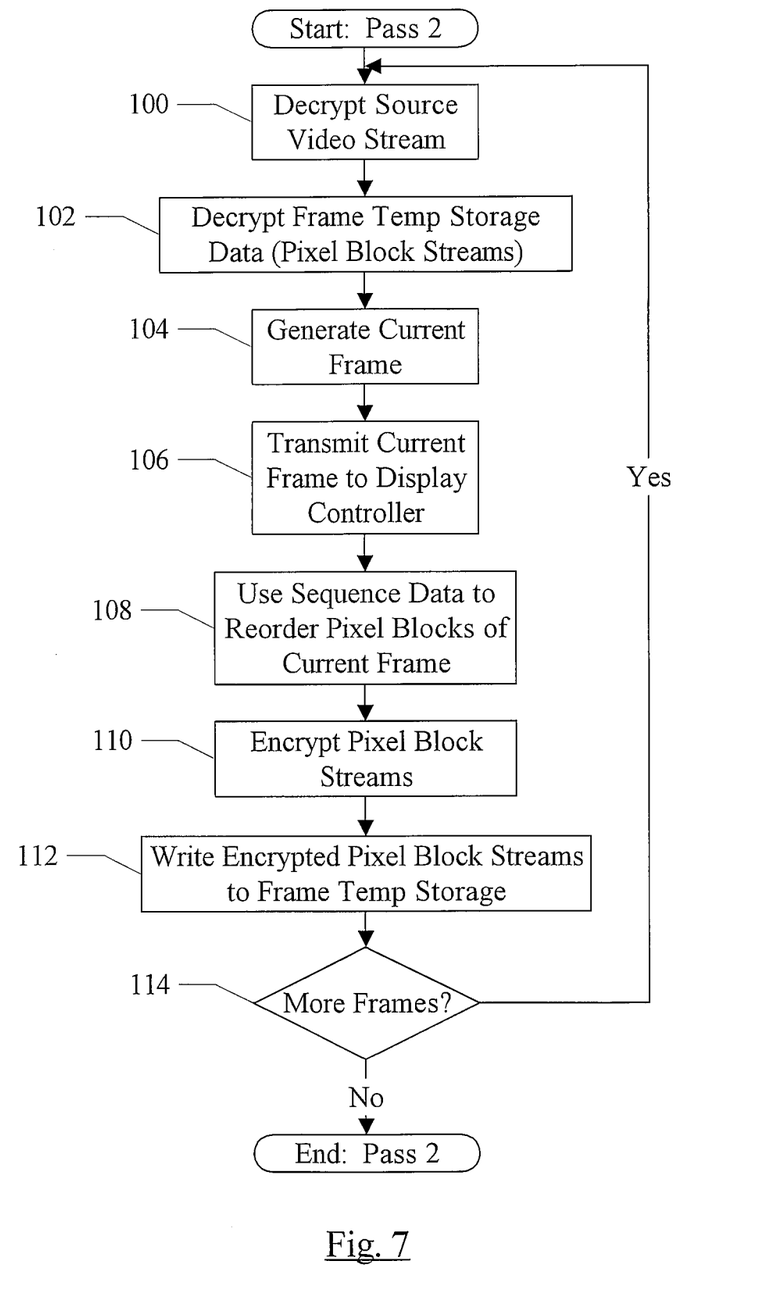
FIG. 7 is a flowchart illustrating operation of one embodiment of the integrated circuit to protect video content during a second pass through the video stream.

Turning next to FIG. 7, a flowchart is shown illustrating operation of one embodiment of the IC 12 (and more particularly the decrypt unit 24, the decompressor 26, and the encrypt unit 32, in one embodiment) during the second pass through a source video stream 18. While the blocks are shown in a particular order for ease of understanding, other orders may be used. Blocks may be performed in parallel in combinatorial logic circuitry in the decrypt unit 24 and the decompressor 26. Blocks, combinations of blocks, and/or the flowchart as a whole may be pipelined over multiple clock cycles, as desired.

The decrypt unit 24 may decrypt the source video stream and provide the decrypted video stream to the decompressor 26 (block 100). In embodiments which buffer the decrypted stream from the first pass, block 100 may be eliminated. The decrypt unit 24 may also decrypt pixel block streams corresponding to the current frame for up to N preceding frames. The encrypted pixel block streams may be read from the frame temp storage 34 (block 102).

The decompressor 26 may generate the current frame (block 104), reconstructing the frame from earlier frame data that has been decrypted from the frame temp storage 34 and data that is explicitly included in the current frame in the compressed video stream. The decompressor 26 need only determine, for a given pixel block of the current frame, which of the preceding N frames contains the pixel block to be used to generate the given pixel block (or determine that the given pixel block is explicitly included in the source video stream 18). The decompressor 26 may then read the next pixel block from the decrypted pixel block stream that corresponds to the identified preceding frame. The decompressor 26 may generate the current frame in the image buffer 28. The decompressor 26 may transmit the current frame to the display controller 30 for display (block 106). For example, the decompressor 26 may inform the display controller 30 that the frame is available in the image buffer 28. Alternatively, the display controller 30 may automatically read the contents of the image buffer 28 whenever a refresh of the display screen is needed, in which case no communication may be needed.

The encrypt unit 32 may receive the sequence data 36 for the current frame, and may use the data to reorder the pixel blocks from the image buffer 28 to write the pixel block streams to memory (block 108). The encrypt unit 32 may encrypt the pixel block streams, and write the encrypted pixel block streams to the frame temp storage 34 in memory 14 (blocks 110 and 112). If there are still more frames in the compressed video stream to be processed (decision block 114, "yes" leg), the processing of pass 2 may continue. Otherwise, the processing is complete.

While the sequence data 36 need not be encrypted (since it is not actually protected content), additional security measures may be implemented if desired. For example, the data identifying a pixel block (e.g. x and y coordinates) may be randomly incremented or decremented as long as the resulting coordinates are still within the pixel block. The resulting sequence data 36 may be more difficult for an unauthorized party to interpret.

Figure 8:
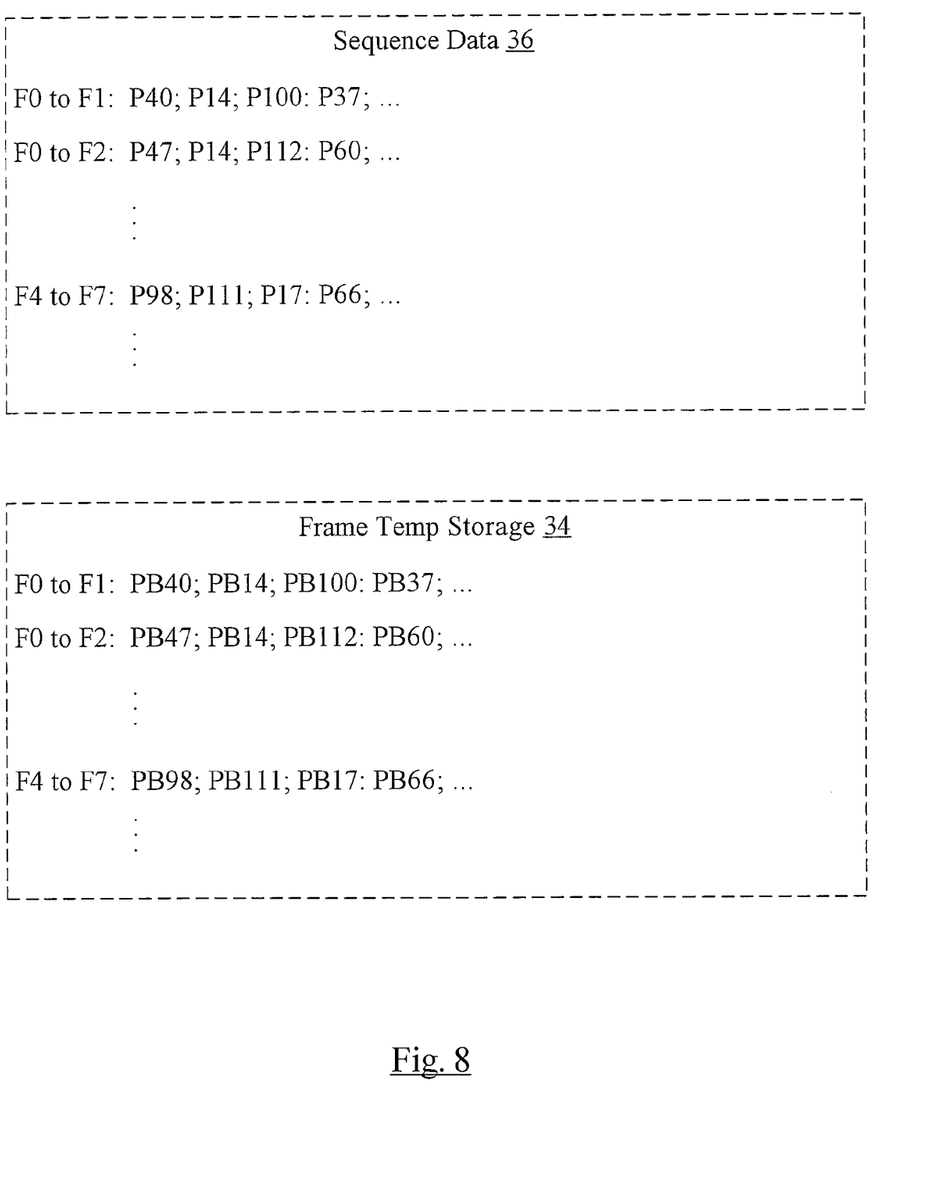
FIG. 8 is a block diagram illustrating an example of sequence data and frame temp storage for one embodiment.

Turning now to FIG. 8, an example of sequence data 36 and corresponding pixel block streams in the frame temp storage 34. In FIG. 8, examples of sequence data 36 from frame 0 (F0) to frame 1 (F1), F0 to frame 2 (F2), and frame 4 (F4) to frame 7 (F7) are shown. There may be many other sequences in the sequence data, depending on the number of frames in the video sequence and the number of preceding frames from which a given frame may read pixel blocks. The F0 to F1 sequence, for example, identifies pixel blocks in F0 that are referenced in F1, in the order that they will be referenced. The sequence may comprise pointers to the pixel blocks in F0 (e.g. x and y coordinates, a pixel block number, etc.). The pointers are illustrated in FIG. 8 as P"#", there the "#" denotes different pixel blocks.

In the frame temp storage 34, corresponding encrypted pixel block streams are shown. For example, the F0 to F1 stream includes pixel blocks PB40, PB14, PB100, and PB37 corresponding to pointers P40, P14, P100, and P37 in the sequence data. Of course, the data in frame temp storage 34 is actually encrypted, but the data when decrypted provides the corresponding pixel blocks as shown in FIG. 8.

Computer Accessible Storage Medium

Figure 9:
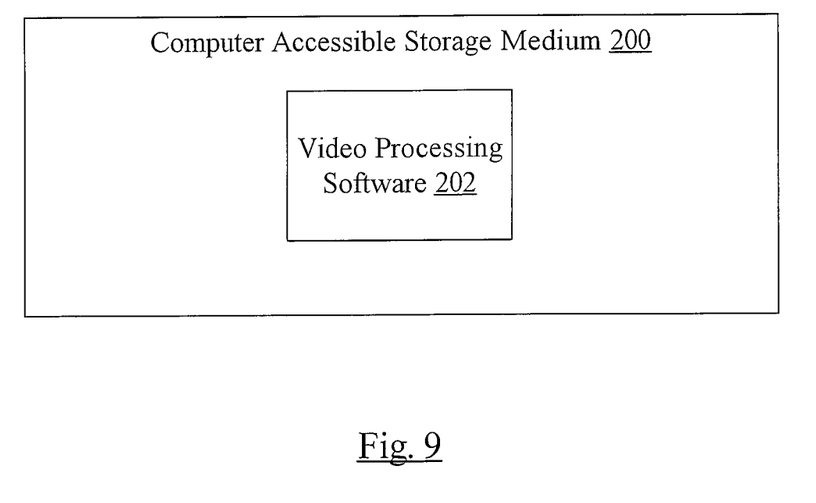
FIG. 9 is a block diagram of one embodiment of a computer accessible storage medium.

Turning next to FIG. 9, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible storage medium 200 in FIG. 9 may store video processing software 202. The video processing software 202 may comprise instructions which, when executed (e.g. by a processor in the other circuitry 22 in FIG. 1), may any software portion of the video processing described herein. For example, the video processing software 202 may comprise instructions which implement any part of the flowcharts of FIGS. 4, 6, and 7 Generally, the computer accessible storage medium 200 may store any set of instructions which, when executed, implement a portion or all of the flowcharts shown in FIGS. 4, 6, and 7. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
   receiving an encrypted, compressed video stream in an integrated circuit; and
   decrypting and decompressing the encrypted, compressed video stream, wherein the decrypting and decompressing comprises:
      for each given frame of a plurality of frames in the video stream, identifying pixel blocks in a plurality of previous frames that are used to reconstruct the given frame, the identifying responsive to control data in the video stream;
      generating separate sequence data for each previous frame of the plurality of previous frames that is used to reconstruct the given frame, the sequence data corresponding to a given previous frame and the given frame identifying which pixel blocks in the given previous frame are accessed to reconstruct the given frame, the identifying listing identifiers of the pixel blocks in an order of access to the pixel blocks in reconstructing the respective given frame, wherein the sequence data for each respective previous frame includes separate sequence data for each given frame, the separate sequence data identifying the pixel blocks for that given frame in the order of access to the pixel blocks;
      reconstructing a first frame in the video stream;
      responsive to reconstructing the first frame, generating one or more pixel block streams from the pixel blocks in the first frame according to the sequence data for the first frame, each pixel block stream corresponding to a subsequent frame of the plurality of frames that occurs subsequent to the first frame in the video stream and that has not yet been reconstructed, wherein the subsequent frame accesses at least one pixel block in the first frame, and wherein the pixel block stream comprises the pixel blocks of the first frame in the order accessed by the subsequent frame, wherein the order is different from the order of the pixel blocks in the first frame;
      encrypting the pixel block streams;
      writing the encrypted pixel block streams to an external memory separate from the video stream; and
      reconstructing a second frame, the reconstructing comprising:
         decrypting a plurality of encrypted pixel block streams that correspond to the second frame; and
         using the plurality of decrypted pixel block streams to reconstruct the second frame responsive to the control data in the video stream, wherein the reconstructing comprises selecting a next block from a given pixel block stream responsive to the control data indicating that the corresponding previous frame is a source of a pixel block in the second frame.

2. The method as recited in claim 1 wherein identifying pixel blocks and generating sequence data are performed during a first pass through the video stream, and wherein reconstructing the first frame, generating the pixel block streams, encrypting the pixel block streams, and writing the encrypted pixel block streams are performed in a second pass through the video stream.

3. The method as recited in claim 2 further comprising writing the sequence data to the external memory during the first pass.

4. The method as recited in claim 2 further comprising sending the first frame to a display controller for display during the second pass.

5. The method as recited in claim 1 wherein the encrypting is performed according to a sequential encryption algorithm.

6. The method as recited in claim 5 wherein the sequential encryption algorithm implements a recursive generation function.

7. An integrated circuit comprising:
a decompressor;
an encrypt unit;
an on-chip image buffer coupled to the decompressor and the encrypt unit; and
a decrypt unit coupled to the decompressor;
wherein the decompressor is configured to receive a compressed video stream, wherein the decompressor is configured to reconstruct a first frame of the video stream in the on-chip buffer, and wherein the encrypt unit is configured to generate a plurality of pixel block streams from pixel blocks of the first frame in the on-chip buffer according to sequence data describing which pixel blocks of the first frame are accessed by a plurality of subsequent frames of the video stream, wherein pixel block identifiers in the sequence data are listed in an order of access to the pixel blocks to reconstruct a given subsequent frame of the plurality of subsequent frames of the video stream, each pixel block stream corresponding to a different subsequent frame that accesses at least one pixel block in the first frame and that has not yet been reconstructed, and wherein the pixel block stream comprises the pixel blocks of the first frame in the order accessed by the subsequent frame, wherein the order is different from the order of the pixel blocks in the first frame, and wherein the sequence data was previously generated via processing of the compressed video stream by the integrated circuit, wherein the sequence data for each respective frame of the video stream includes separate sequence data for each respective frame and for each different subsequent frame that access pixel blocks from that respective frame as indicated by control data in the video stream, and wherein the encrypt unit is configured to encrypt the pixel block streams to be written to an external memory separate from the video stream, wherein the external memory is external to the integrated circuit; and
wherein the decompressor is configured to reconstruct a second frame, the reconstruction of the second frame including the decrypt unit decrypting a plurality of encrypted pixel block streams that correspond to the second frame and the decompressor using the pixel blocks from the plurality of decrypted pixel block streams to reconstruct the second frame responsive to the control data in the video stream, wherein the decompressor is configured to select a next block from a given pixel block stream responsive to the control data indicating that a corresponding previous frame is a source of a pixel block in the second frame.

8. The integrated circuit as recited in claim 7 wherein the encrypt unit implements a sequential encryption algorithm.

9. The integrated circuit as recited in claim 8 wherein the sequential encryption algorithm includes a recursive generation function.

10. A system comprising:
one or more memory devices; and
an integrated circuit coupled to the one or more memory devices, wherein the integrated circuit includes an on-chip image buffer and a memory controller, and wherein the memory controller is configured to interface to the one or more memory devices, and wherein the one or more memory devices are configured to store a compressed video stream, wherein the memory controller is configured to perform a plurality of read operations to read the compressed video stream, and wherein the integrated circuit is configured to reconstruct a first frame of the video stream in the on-chip buffer, and wherein the integrated circuit is configured to generate sequence data describing which pixel blocks of the first frame are accessed to reconstruct a given subsequent frame of a plurality of subsequent frames of the video sequence responsive to control data in the video sequence, and wherein the sequence data lists pixel block identifiers in an order of access to pixel blocks in the first frame to reconstruct the given subsequent frame of the plurality of subsequent frames, wherein the sequence data for the first frame comprises separate sequence data that identifies a plurality of sequences of pixel blocks, wherein each of the plurality of sequences corresponds to a different subsequent frame of the plurality of subsequent frames of the video stream, and wherein the integrated circuit is configured to generate one or more pixel block streams from pixel blocks of the first frame responsive to the sequence data, each pixel block stream corresponding to the different subsequent frame that accesses at least one pixel block in the first frame and that has not yet been reconstructed, and wherein the pixel block stream comprises the pixel blocks of the first frame in the order accessed by the subsequent frame, wherein the order is different from the order of the pixel blocks in the first frame, and wherein the integrated circuit is configured to encrypt the pixel block streams to be written to the one or more memory devices separate from the video stream, and wherein the integrated circuit is configured to reconstruct a second frame, including decrypting a plurality of encrypted pixel block streams that correspond to the second frame and using the plurality of decrypted pixel block streams to reconstruct the second frame responsive to the control data in the video stream, wherein the integrated circuit is configured to select a next block from a given pixel block stream responsive to the control data indicating that the corresponding previous frame is a source of a pixel block in the second frame.

11. The system as recited in claim 10 wherein the integrated circuit is configured to identify pixel blocks in one or more previous frames of the video stream that are used to reconstruct each frame in the video stream, and wherein the integrated circuit is configured to generate the sequence data for each previous frame identifying an order of access of pixel blocks in the respective previous frame to reconstruct each frame.

12. The system as recited in claim 10 wherein the integrated circuit implements a sequential encryption algorithm for the one or more pixel block streams.

13. The system as recited in claim 12 wherein the sequential encryption algorithm includes a recursive generation function.

14. A non-transitory computer accessible storage medium storing a plurality of instructions which, when executed within an integrated circuit coupled to an external memory:

decrypt and decompress an encrypted, compressed video stream, including:

for each given frame of a plurality of frames in the video stream, identify pixel blocks in a plurality of previous frames that are used to reconstruct the given frame, the identifying responsive to control data in the video stream;

generate separate sequence data for each previous frame of the plurality of previous frames that is used to reconstruct the given frame, the sequence data corresponding to a given previous frame and the given frame identifying which pixel blocks in the given previous frame are accessed to reconstruct the given frame, the identifying listing identifiers of the pixel blocks in an order of access to the pixel blocks in reconstructing the respective given frame, wherein the sequence data for each respective previous frame includes separate sequence data for each given frame, the separate sequence data identifying the pixel blocks for that given frame in the order of access to the pixel blocks;

reconstruct a first frame in the video stream;

responsive to reconstructing the first frame, generate one or more pixel block streams from the pixel blocks in the first frame according to the sequence data for the first frame, each pixel block stream corresponding to a subsequent frame of the plurality of frames that occurs subsequent to the first frame in the video stream and that has not yet been reconstructed, wherein the subsequent frame accesses at least one pixel block in the first frame, and wherein the pixel block stream comprises the pixel blocks of the first frame in the order accessed by the subsequent frame, wherein the order is different from the order of the pixel blocks in the first frame;

encrypt the pixel block streams;

write the encrypted pixel block streams to the external memory separate from the video stream; and     reconstruct a second frame, including:

decrypt a plurality of encrypted pixel block streams that correspond to the second frame; and         use the plurality of decrypted pixel block streams to reconstruct the second frame responsive to the control data in the video stream, wherein the reconstructing comprises selecting a next block from a given pixel block stream responsive to the control data indicating that the corresponding previous frame is a source of a pixel block in the second frame.

15. The non-transitory computer accessible storage medium as recited in claim 14 wherein the plurality of instructions, when executed, write the sequence data to the external memory.

16. The non-transitory computer accessible storage medium as recited in claim 14 wherein the encryption is performed using to a sequential encryption algorithm that includes a recursive generation function.

\* \* \* \* \*